(12) United States Patent
Kay

(10) Patent No.: US 6,223,166 B1
(45) Date of Patent: Apr. 24, 2001

(54) CRYPTOGRAPHIC ENCODED TICKET ISSUING AND COLLECTION SYSTEM FOR REMOTE PURCHASERS

(75) Inventor: Jeffrey B. Kay, Springfield, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/979,240

(22) Filed: Nov. 26, 1997

(51) Int. Cl.7 ........................................................ G06F 7/00
(52) U.S. Cl. ................ 705/26; 705/27; 380/51; 380/55
(58) Field of Search .......................... 380/51, 55; 713/179, 713/182; 705/26, 27

(56) References Cited

U.S. PATENT DOCUMENTS

| | | |
|---|---|---|
| 4,032,946 | 6/1977 | Wakatsuki et al. . |
| 4,193,114 | 3/1980 | Benini . |
| 4,322,614 | 3/1982 | Sloan et al. . |
| 4,663,664 | 5/1987 | Ragan et al. . |
| 5,557,518 | 9/1996 | Rosen . |
| 5,754,654 * | 5/1998 | Hiroya et al. ....................... 380/24 |

* cited by examiner

Primary Examiner—Thomas R. Peeso
(74) Attorney, Agent, or Firm—Morgan & Finnegan, LLP

(57) ABSTRACT

A cryptographic encoded, ticket issuing and collection system for real-time purchase of tickets by purchasers at remote user stations in an information network that includes a plurality of remote user stations coupled to a server in an information network, e.g., the Internet, for purchase of services, products, or tickets to an event. An operator of the remote user station selects a ticket for purchase to an event using standard protocols of information network. An electronic ticket is transmitted to the operator and includes a cypher code created using a public key cryptography system. The operator displays the electronic ticket for verification purposes and proceeds to print out the ticket at the station. The ticket is presented to a ticket collector whereupon the ticket is scanned by a portable terminal for decoding the cypher code using a public key reloaded into the terminal by the producers of the event. The decoded cypher code is compared against the event description stored in the portable terminal and if equal, the ticket is accepted for admission to the event. The ticket information is stored in the portable terminal and subsequently uploaded to the information system to check for duplicate tickets.

12 Claims, 3 Drawing Sheets

CRYPTOGRAPHIC ENCODED TICKET ISSUING AND COLLECTION SYSTEM FOR REMOTE PURCHASERS

BACKGROUND OF INVENTION

1. Field of Invention

This invention relates to data processing systems. More particularly, the invention relates to cryptographic encoded ticket issuing and collection systems for remote purchasers.

2. Description of Prior Art

Current distribution systems rely very heavily on the paper upon which tickets are printed. The assumption of the ticketing agents is that the ticket paper is very difficult to reproduce and, therefore, duplicate. The ticket collectors visually verify, upon receipt, the tickets for authenticity and then physically alter the tickets to prevent the re-use of the ticket. Such ticketing systems are extremely simple and work for situations with the following characteristics:

Reserved Seats (Prevents duplicates).

Relatively Low Cost (Situations where ticket fraud is not a critical problem—in contrast to Airline tickets where fraud is a severe threat).

Multiple ticket collectors.

Offline ticket collection (No readily available, network computer system).

While the opportunity for smart cards and other ticket storage systems exist for ticketing systems, such systems add to the requirements of an information system to collect and process the card and like devices. In some environments this would be acceptable, but the ticket fraud situation in the United States does not lend itself to such systems. However, the increasing number of personal computers and PC kiosks suggest a new form of electronic ticket which is a hybrid between a completely electronic, smart card (or similar) ticket and current paper-based tickets produced by ticket agents. A hybrid system should have the following prerequisites:

1. A readily available distribution mechanism for the tickets.
2. A system to produce a hard copy of the ticket.
3. A system to authenticate the validity of the ticket.
4. Optimally, a system to ensure that no duplicate tickets exist.

Prior art related to ticket issuing systems includes the following:

U.S. Pat. No. 5,557,518 issued Sep. 17, 1996, discloses a system for open electronic commerce in which trusted agents establish cryptographically secure sessions to transfer money and goods.

U.S. Pat. No. 4,663,664 issued May 5, 1987, discloses an electronic ticket method in which a removable plug-in unit serves as a ticket after de-scrambling an electronic ticket transmitted in a video program.

U.S. Pat. No. 4,193,114 issued Mar. 11, 1980, discloses a ticket issuing system in which the names of desired destinations or a list of names of destinations are displayed on a video screen after keyboard entry of a desired destination. The destinations on the display are accompanied by a code number which permits an operator to definitively key the destination into the machine for the issuance of a ticket.

U.S. Pat. No. 4,032,946 issued Jun. 28, 1997, discloses an apparatus for selling betting tickets wherein the betting information recorded on original betting ticket may be altered by a processor in accordance with operator instructions and a new betting ticket containing altered betting information issued.

U.S. Pat. No. 4,322,614 issued Mar. 30, 1982, discloses a light weight, portable apparatus for rapidly reading continuously and sequentially a plurality of ticket records having specific data encoded thereon as tickets are removed individually from a supply magazine and conveyed along the prescribed path by a ticket feed assembly.

None of the prior art discloses a hybrid electronic ticket issuing system for mass purchases by remote users where the tickets are distributed electronically and include cypher code for authenticating the use of the tickets by a holder via portable terminals decrypting, validating and recording the cipher coded tickets, the recorded ticket collection information subsequently checked for duplication by uploading to a host system.

SUMMARY OF THE INVENTION

An object of the invention is a ticket issuing and collection system and method of operation for real-time mass purchases of cypher-coded tickets by remote users.

Another object is a ticket issuing and collection system and method of operation in which cypher-coded, electronic-issued tickets for an event are acquired from a seller and printed in hard copy form by a remote purchaser Another object is a ticket issuing and collection system and method of operation for real-time purchases of cypher-coded, electronic tickets by a remote user through a distributed information system.

Another object is a ticket issuing and collection system and method of operation in a distributed information system in which cypher-coded, electronic tickets for an event are issued in hard copy form by a purchaser for authentication at the event by a scanning device.

Another object is a ticket issuing and collection system and method of operation in which a scanning device electronically authenticates and records a cypher-coded hard copy ticket acquired and printed by a purchaser from an information system.

Another object is a ticket issuing and collection system in a distributed information system for real-time purchase of cypher-coded tickets by a remote purchaser for an event, the ticket enabling authentication and recording thereof by a scanning device for subsequent checking for duplicate tickets.

These and other objects, features and advantages of the present invention are achieved in a distributed information network, for example, the Internet, and portable collection terminals for generating, distributing and collecting cypher-coded tickets personalized to the purchaser through cryptographic techniques. A remote purchaser inter acts with a designated server on the Internet to purchase and print out, using a standard PC assembly, a cypher-coded ticket for an event or service or product or the like, offered by a seller at a web site on the Internet. The purchaser supplies the purchase details for the event and the seller, after confirmation of space available for the event, transmits a cypher-coded electronic ticket tied to the event for display by the purchaser on the standard PC assembly. After approval, the purchaser prints out a hard copy of the cypher-coded electronic ticket tied to the event for presentation to the ticket collectors at the event. The ticket collectors use a portable terminal pre-loaded with an asymmetric or symmetric key for decrypting the code in the ticket. The decrypted code is evaluated to ensure that the ticket is valid, after which the ticket information is stored in the terminal. From time to time, the terminal is uploaded to an information processor system to check the stored collected ticket information for duplicate tickets. The asymmetric keys stored in the encoded ticket and at the terminal are changed for each event to prevent ticket fraud.

DESCRIPTION OF THE DRAWING

The present invention will be further understood from the following detailed description of preferred embodiment and an appended drawing, in which.

DESCRIPTION OF PREFERRED EMBODIMENT

Figure 1:
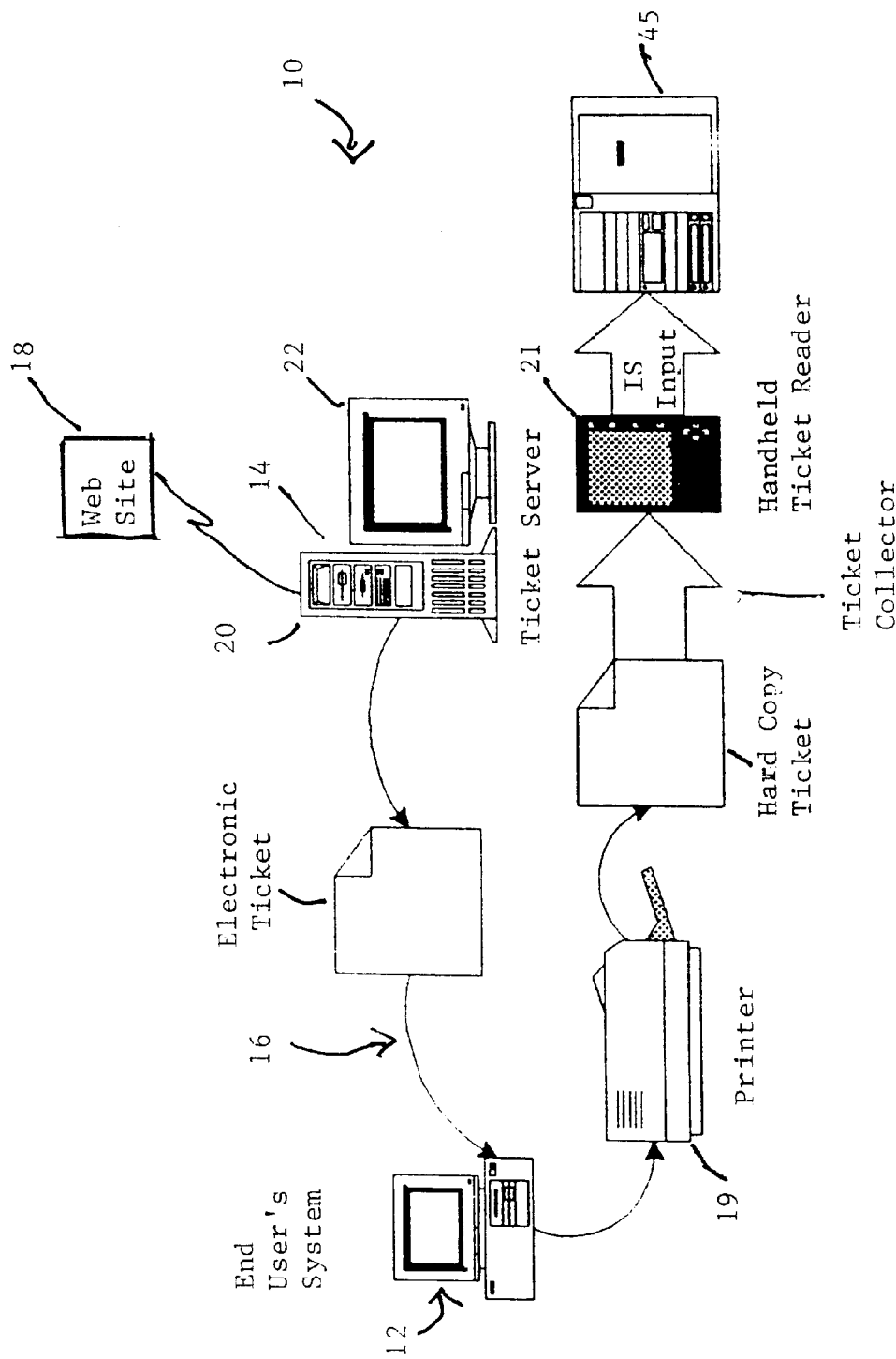
FIG. 1 is a representation of a cryptographic-encoded ticket issuing and collection system for remote purchasers using an information network in accordance with the principles of the present invention.

In FIG. 1, a system 10 incorporating the principles of the present invention includes a remote user station 12 coupled to a ticket server 14 through an information network 16, e.g., the Internet. The server 14 is electronically linked to a web site 18 in the Internet for displaying events, products or services, for selection and purchase by an operator of the remote user station. Web sites are connections to the Internet which when contacted by a user serve as a gateway to information available from the web site including, for example, the purchase of products or services displayed on a home page. See the text "The Internet Unleashed" by Sams Publishing, A Division of Prentice-Hall Computer Publishing, Indianapolis, Ind. 1994 (ISBN 0-672-30466-X) which is fully incorporated herein by reference. Such purchases may be made in accordance with well-known protocols, as described for example in the text "The Internet Unleashed?" supra. The web site includes a processor 20 and a display interface 22 used by an operator for responding to ticket requests from purchasers at the remote user stations 12. In response to such requests, the display interface operators transmit electronic ticket information to the purchasers.

Figure 2:
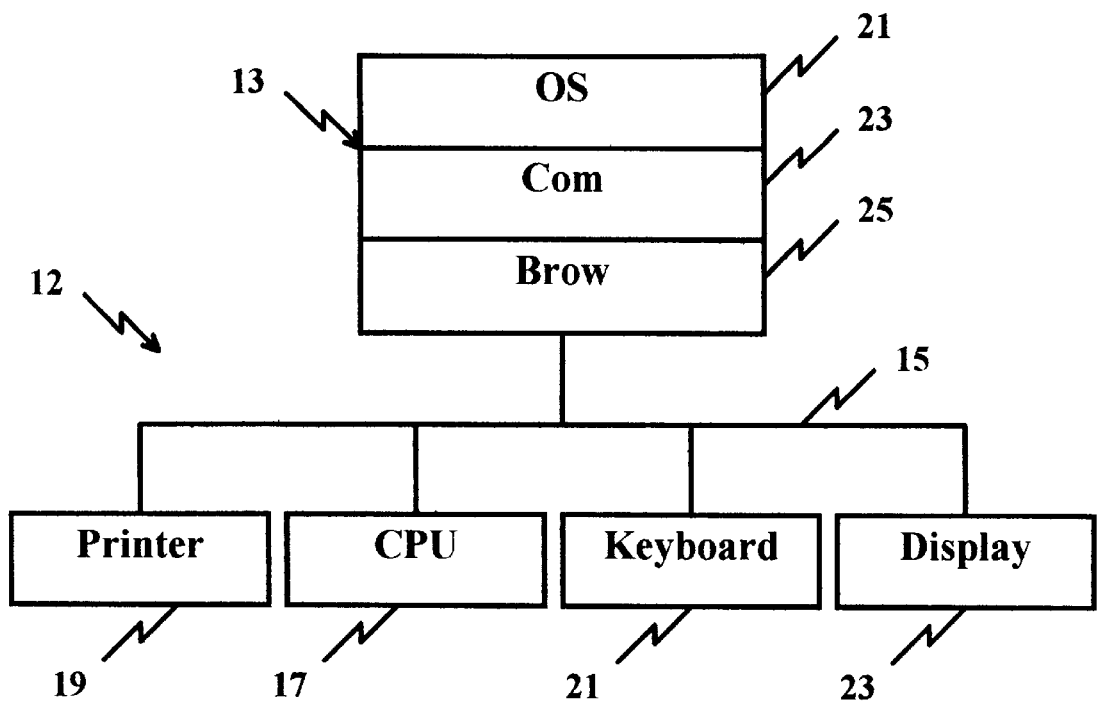
FIG. 2 is a block diagram of a remote end user station for purchasing cypher-encoded tickets from a seller through a distributed information network in accordance with the system of FIG. 1.

In FIG. 2, the remote user station 12 includes a memory 13 coupled through an electrical bus 15 to a processor 17, a printer 19, a keyboard 21, and a display 23. A purchaser uses the remote station to purchase tickets, services or the like for an event offered for purchase by a web site on the network 16, as will be described more fully in detail hereinafter. The memory 13 includes stored program instructions in the form of software programs for interacting with the Internet 16, through the server 14. An operating system software program 21, for example, OS/2, Windows or the like, is used to manage the input/output devices in inter acting with a web site. A commercial application program 23 provided by an Internet Service Provider (ISP) is used by the operator to communicate with a selected web site. A browser program 25 for example, Netscape 3.0, manufactured by Netscape Corporation, Mountain View, Calif., enables an operator to select the web site on the Internet.

Returning to FIG. 1, electronic tickets are generated by the web site 18 upon request and include cipher coded information descriptive of the event, venue, seat location or other description pertinent to the use of the ticket at the event and a signet which ties the ticket to the purchaser. A signet may be a social security number; credit card number or the purchaser's name. Preferably, an asymmetric cryptographic system is used for encoding the ticket information. One asymmetric crypto system is Diffie-Hellman described in an article entitled "Privacy and Authentication: An Introduction to Cryptography", Procedures I.E.E.E. 67, pages 397–427 (March 1979). Alternatively, a symmetric key system may be used such as the U.S. Standard Data Encryption Standard (DES) issued by the National Institute Of Standards and Technology (NIST).

As a second level of cipher coded ticket protection, a digital signature may be included in the ticket. The digital signature is created by the seller recording a message in the ticket using his private key. The validity of the message can be checked using the seller's public key. Digital signatures are described in the text "Encyclopedia Of Computer Science" edited by A. Ralston and E. Reilly, Third Edition, VanNostrand Rheinhold, New York, N.Y., 1993, pages 369–370 (ISBN 0-442-27679-6). The digital signature and the ticket information may then be further encrypted together using an asymmetric key. To validate a ticket, two keys would be required to access the asymmetric cipher and the digital signature. The two keys would improve ticket fraud prevention in the event one of the key pairs was compromised.

Returning to FIG. 1, the electronic tickets are transmitted over the network 16 to the user station and printed out on the printer 19 by the user after approval by the user. The ticket includes a bar code definitive of the ticket information in encrypted form. A process for converting the encrypted electronic information, e.g., ticket information into a bar code is well known in the prior art and described, for example, in U.S. Pat. No. 4,641,347 issued Feb. 3, 1987. When the ticket is presented to a collector at the event, a portable scanner 27 is used by the collector to scan the ticket bar code for authentication, as will be described in more detail hereinafter, after which the ticket holder is admitted or denied entry to the event.

Figure 3:
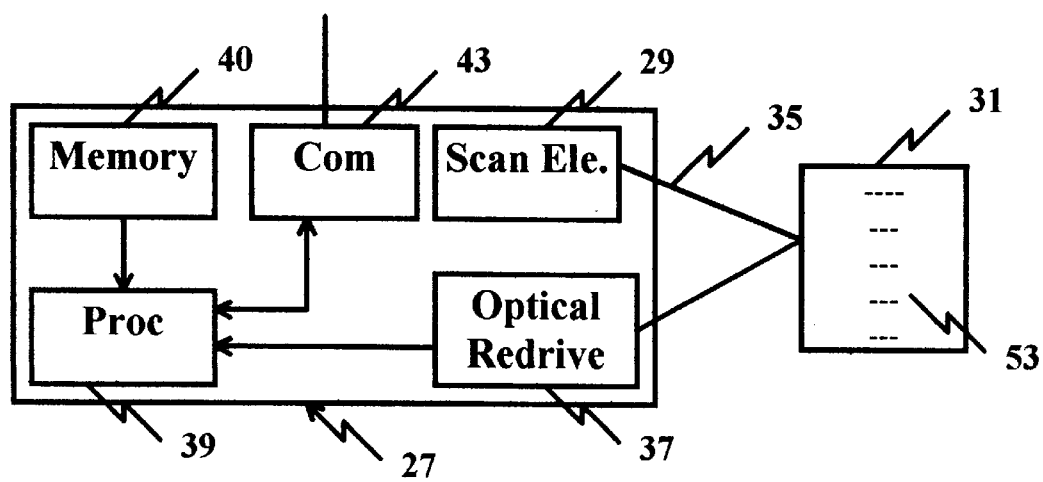
FIG. 3 is a block diagram of a portable terminal for accepting and authenticating cypher-coded tickets used by a remote user for an admission to an event.

In FIG. 3, the portable terminal 27 includes a scanning element 29, such as a laser light, which is activated by the operator for scanning a ticket 31 including a bar code 33 representing cypher code definitive of the ticket information in an asymmetric cryptographic system. The scanning element generates a coherent light beam 35 which is reflected off the bar code 33 and picked up by an optical receiver 37. A processor 39 receives an output from the receiver 37 and checks the bar code against an asymmetric key stored in a memory 40 and assigned to the event by the seller. Using an asymmetric key assigned by the seller to the event, the bar code is decoded and compared against an event description stored in the memory 40. If the event description and decoded cypher code compare, the ticket is authenticated and the holder is granted admission to the event. If the event description and the decoded cypher code do not compare, the ticket holder is denied admission to the event. Ticket information from authenticated tickets is stored in the memory 40 and periodically uploaded through a communication unit 43 to a central information system 45 (See FIG. 1).

Returning again to FIG. 1, the information processing system 45 processes the uploaded collected ticket information from the portable terminals 27 to check for fraudulent duplicate tickets. In one form, the collected ticket information contains the name of the ticket purchaser, the event, the ticket number and/or other information as necessary to tie the ticket to the purchaser. The collected ticket information is compared with ticket information recorded in the system 45 at the time the tickets were purchased and electronically sent to the purchaser. Duplicate tickets can be captured after use as an enforcement technique currently not available with present ticketing systems. In any case, fraudulent tickets would be difficult to create in the present invention for the following reasons:

1. The use of strong cryptographic techniques.
2. Short life of the ticket.
3. Changing keys of the ticket reader on an event basis.

Figure 4:
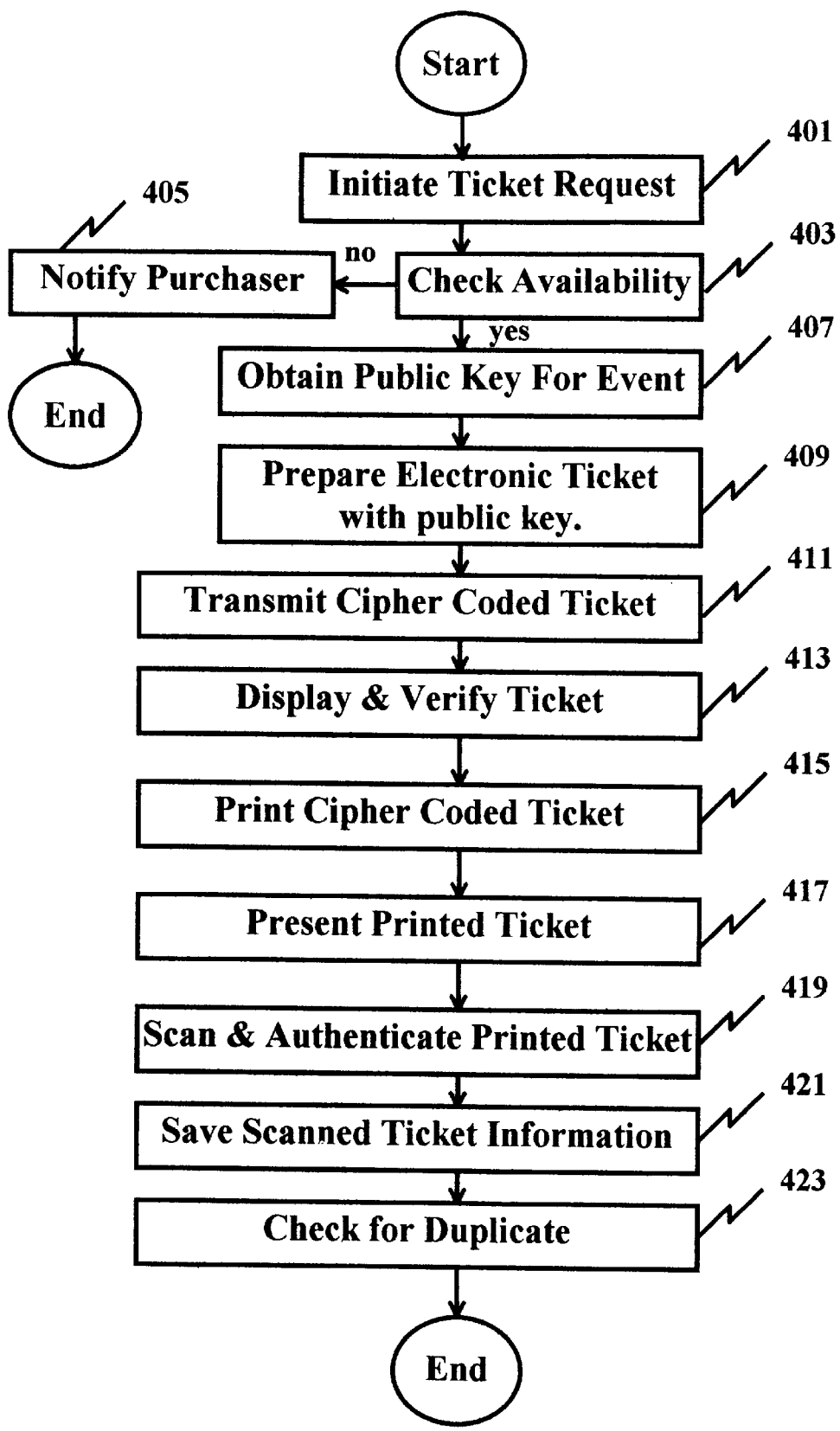
FIG. 4 is a flow diagram of a process for implementing the system of FIG. 1 for issuing cypher-coded tickets through the system of FIG. 1 and authenticating such tickets using the portable terminal of FIG. 3.

The process of merchandising, issuing tickets for an event, and authenticating issued tickets from a information network (e.g., the Internet) will be described in FIG. 4 in conjunction with FIGS. 1, 2 and 3.

The process is initiated in a step 401 in which an operator of a remote user station contacts a web site 18 through a server 14 using the Internet service provider communication package application and the web browser. The web site contains a description of the events and provide the details of date, time, seats, etc., which are transmitted to the operator for presentation in a screen in display 23. The screen provides the purchaser with the protocol for making a selection of a ticket request which is transmitted to the web site and in a step 403, checked for availability. If the event or ticket request details are not available, the web site will initiate an operation 405 to notify the purchaser of the ticket request that it is not available, after which the program will end. If the ticket details are available, an operation 407 is initiated by the web site to determine an applicable cypher code related to an asymmetric key for incorporation into an electronic ticket to be transmitted to the purchaser. The cypher code and asymmetric key are reloaded into the web site by the producers for each event. In an operation 409, the web site prepares the electronic ticket in Hypertext Markup Language (HTML) including the asymmetric key in a bar code 31 for transmission to the purchaser in an operation 411. The purchaser displays and verifies the ticket information against his request in an operation 413. After aceptance by the purchaser, the ticket 31 including the bar code for the event is printed out by the printer 19 in an operation 415. The ticket is presented to a ticket collector in an operation 417 for admission to the event at the time, date and location specified in the ticket. In an operation 419, the ticket collector uses the portable terminal 27 to scan the ticket information for admission to the event. The ticket is accepted by the collector if the bar code, when decoded, using the asymmetric key programmed for the date, corresponds to the ticket information stored in the memory 41 of the terminal 27. The accepted ticket information is stored in the terminal memory 41 in an operation 421 and subsequently, transmitted to the information system 45 in an operation 423 to check for duplicate tickets, after which the process ends.

The asymmetric key for each event is separately generated and may be changed on a daily basis as security dictates. Tickets printed out by the user station are accepted by the portable terminal if the asymmetric key stored in the terminal memory 41 decodes the ticket cypher code 31 whereupon the ticket information is stored in the memory 41 for subsequent transmission to the host system 45 for duplicate checking. To reduce tickets lost by duplication, the terminal 27 should be set with a new decryption key for each event or should at least draw from a pool of keys. Asymmetric key cryptography has the benefit that a lost or stolen portable hand-held device or terminal cannot be used to produce a ticket. The use of the Internet lends the present invention to venues where no information system is feasible, such as in the case of train and bus tickets.

While the present invention has been described in terms of a preferred embodiment, various changes may be made therein without departing from the spirit and scope of the invention, as defined in the appended claims, in which:

I claim:

1. An offline ticket issuing and collection system using a Distributed Information System (DIS) including web sites and portable collection terminals for cryptographically encoded tickets, comprising:
   a) means for enabling an operator to access the DIS to purchase a ticket from a web site for an event or the like electronically described by an owner or operator of the web site;
   b) means included in the web site for preparing an electronic ticket including ticket information in cryptographic code definitive of the event sought to be attended by the operator;
   c) means for displaying the electronic ticket sought to be purchased by the purchaser for approval prior to purchase;
   d) means for printing a hardcopy ticket sought to be purchased, after approval of the electronic ticket by the purchaser, the hardcopy ticket including a bar code definitive of the cryptographic code for authentication purposes; and
   e) means for collecting the hard copy ticket at the event.

2. The system of claim 1 further including means in a portable collection terminal for scanning the hardcopy ticket and decrypting the encoded message to validate the use of the hardcopy ticket for the event.

3. The system of claim 1 further comprising:
   a) means for storing information indicative of validated tickets accepted for the event in the portable collection terminal; and
   b) means for uploading the stored information to an information processing system.

4. The system of claim 1 further comprising:
   a) means for storing an asymmetric or symmetric key in the portable collection terminal.

5. The system of claim 1 further comprising:
   a) means for changing the cryptographic key used at the portable collection terminal according to the event.

6. The system of claim 1 wherein the cryptographic code in the electronic ticket is represented as a bar code in the hardcopy ticket.

7. The system of claim 1 further comprising:
   a) means for including a digital signature with the ticket information.

8. The system of claim 1 further comprising:
   a) means for encrypting a digital signature and the ticket information in a cipher code using an asymmetric key.

9. The system of claim 1 further comprising:
   a) portable terminal means for validating and recording ticket information in tickets accepted for the event; and
   b) means for comparing the stored ticket information against ticket information collected and stored in a host system to determine hardcopy ticket duplication.

10. The method of claim 9 further comprising the steps of:
    a) scanning the hardcopy ticket and decrypting the encoded message to validate the use of the hardcopy ticket for the event using the portable collection terminal including a cryptographic key for decrypting the encoded message.

11. The method of claim 9 further comprising the step of:
   a) translating the cryptographic code of the electronic ticket into a bar code for the hardcopy ticket.

12. In an offline ticket issuing and collection system using a Distributed Information System (DIS) coupled to stations responsive to at least one purchaser desiring to purchase a ticket from a DIS seller to an event and portable collection terminals for validating and accepting tickets to the event, a method for determining the validity of purchased tickets for the event, comprising the steps of:
   a) accessing the distributed information system through station to purchase a ticket to the event from the DIS seller;
   b) preparing in the DIS an electronic ticket definitive of the event and sought to be purchased by the purchaser;
   c) displaying at the station the electronic ticket for approval by the purchaser prior to purchase;
   d) transmitting the electronic ticket to the station for printout of a hardcopy ticket, after approval of the electronic ticket by the purchaser, the electronic ticket including an encoded message descriptive of the purchaser and the event for incorporation into the hardcopy ticket; and
   e) collecting the hardcopy ticket at the event.

\* \* \* \* \*